US008822881B2

(12) United States Patent
Feng

(10) Patent No.: US 8,822,881 B2
(45) Date of Patent: Sep. 2, 2014

(54) SELECTIVE SOLDERING USING FIBER OPTIC DEVICE

(75) Inventor: Xiangyang Feng, Singapore (SG)

(73) Assignee: HGST Netherlands B.V., Amsterdam (NL)

(*) Notice: Subject to any disclaimer, the term of this patent is extended or adjusted under 35 U.S.C. 154(b) by 889 days.

(21) Appl. No.: 11/982,258

(22) Filed: Oct. 31, 2007

(65) Prior Publication Data

US 2009/0108052 A1  Apr. 30, 2009

(51) Int. Cl.
*B23K 26/00* (2014.01)

(52) U.S. Cl.
USPC ............. 219/121.63; 219/121.64; 219/121.76

(58) Field of Classification Search
CPC .. B23K 1/0016; B23K 1/0056; B23K 26/067; B23K 26/0676
USPC ........ 219/121.63, 121.64, 121.76; 228/180.1, 228/18, 121, 33
See application file for complete search history.

(56) References Cited

U.S. PATENT DOCUMENTS

| | | | | |
|---|---|---|---|---|
| 4,578,554 A * | 3/1986 | Coulter | .................... | 219/121.63 |
| 4,877,175 A * | 10/1989 | Jones et al. | .................... | 228/102 |
| 4,963,714 A * | 10/1990 | Adamski et al. | ......... | 219/121.63 |
| 5,055,652 A * | 10/1991 | Jones et al. | ............. | 219/121.64 |
| 5,472,772 A * | 12/1995 | Jones | ............................. | 428/192 |
| 5,565,119 A * | 10/1996 | Behun et al. | ............. | 219/121.63 |
| 6,072,148 A * | 6/2000 | Azdasht | .................. | 219/121.63 |
| 6,211,483 B1 * | 4/2001 | Bishop | ..................... | 219/121.63 |
| 6,513,701 B2 * | 2/2003 | Mead et al. | ................ | 228/248.1 |
| 6,818,854 B2 * | 11/2004 | Friedman et al. | .......... | 219/121.6 |

* cited by examiner

*Primary Examiner* — John Wasaff

(57) ABSTRACT

A fiber optic device for enabling soldering is described. The fiber optic device includes an entry portion comprising an optical fiber bundle for receiving a single light beam wherein the optical fiber bundle splits the light beam into a plurality of separate portions, each of the separate portions for enabling soldering. The fiber optic device further includes an exit portion for emitting each of the plurality of separate portions of the light beam in a pattern to enable soldering at a plurality of locations simultaneously utilizing the single light beam.

16 Claims, 6 Drawing Sheets

500 providing an entry portion of a fiber optic bundle for receiving a single light beam for enabling soldering, the fiber optic bundle for splitting the single light beam into a plurality of separate beams, each of the separate beams for enabling soldering
502

providing an exit portion of the fiber optic bundle for emitting each of the plurality of separate beams in a geometric pattern to enable soldering at a plurality of locations simultaneously with the single light beam.
504

SELECTIVE SOLDERING USING FIBER OPTIC DEVICE

TECHNICAL FIELD

The present invention relates to the field of hard disk drive development, and more particularly to a method and system for soldering a flex cable of a hard disk drive.

BACKGROUND ART

Hard disk drives (HDD) are used in almost all computer system operations. In fact, most computing systems are not operational without some type of HDD to store the most basic computing information such as the boot operation, the operating system, the applications, and the like. In general, the HDD is a device which may or may not be removable, but without which the computing system will generally not operate.

In operation, the hard disk is rotated at a set speed via a spindle motor assembly having a central drive hub. There are tracks at known intervals across the disk. When a request for a read of a specific portion or track is received, the HDD aligns a read/write head, via an arm, over the specific track location and the head reads the information from the disk. In the same manner, when a request for a write of a specific portion or track is received, the HDD aligns the head, via the arm, over the specific track location and the head writes the information to the disk.

Since the HDD is an electronic device, there are wires and connectors that are needed for operation and as HDD are reduced in size, the tolerances for the components within the hard disk drive, including the connectors, are reduced. Some of the electrical components of the HDD require solder connections and in some cases, the reduced size of the electrical components leads to problems with soldering such as substrate damage.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A fiber optic device for enabling soldering is described. The fiber optic device includes an entry portion comprising an optical fiber bundle for receiving a single light beam wherein the optical fiber bundle splits the light beam into a plurality of separate portions, each of the separate portions for enabling soldering. The fiber optic device further includes an exit portion for emitting each of the plurality of separate portions of the light beam in a pattern to enable soldering at a plurality of locations simultaneously utilizing the single light beam.

BRIEF DESCRIPTION OF THE DRAWINGS

FIG. 5 is a flowchart of an exemplary method for soldering in accordance with one embodiment of the present invention.

BEST MODES FOR CARRYING OUT THE INVENTION

Reference will now be made in detail to the alternative embodiment(s) of the present invention. While the invention will be described in conjunction with the alternative embodiment(s), it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

The discussion will begin with an overview of a HDD and components connected therewith. The discussion will then focus on embodiments of a method and system for enabling localized soldering using a fiber optic device. In one embodiment of the invention, the exemplary fiber optic device enables localized soldering at a plurality of locations simultaneously utilizing a single light beam. In one embodiment, the localized soldering method and system is used for soldering components on a flex cable. In one embodiment, the flex cable is a component of a hard disk drive.

Overview

In general, the present technology enables localized soldering of a plurality of components simultaneously. In particular, embodiments of the present invention can be used for soldering components on a flex cable without damaging the flex cable substrate because the soldering is localized to the solder locations. Moreover, the described benefits are realized with minimal modification to the overall HDD manufacturing process in general and to the connector, card and base HDD structure in particular. Furthermore, the present technology is backward compatible with legacy HDD connectors.

In general, the fiber optic device of the present invention splits a solder beam into a plurality of beams such that a single solder beam can be utilized to enable soldering of a plurality of components simultaneously. The fiber optic device shapes the beams according to a layout of solder pads to be soldered such that the soldering beam is localized to solder pads without encroaching on the solder pad substrate. Embodiments of the present invention enable more precise soldering with decreased substrate damage.

Operation

Figure 1:
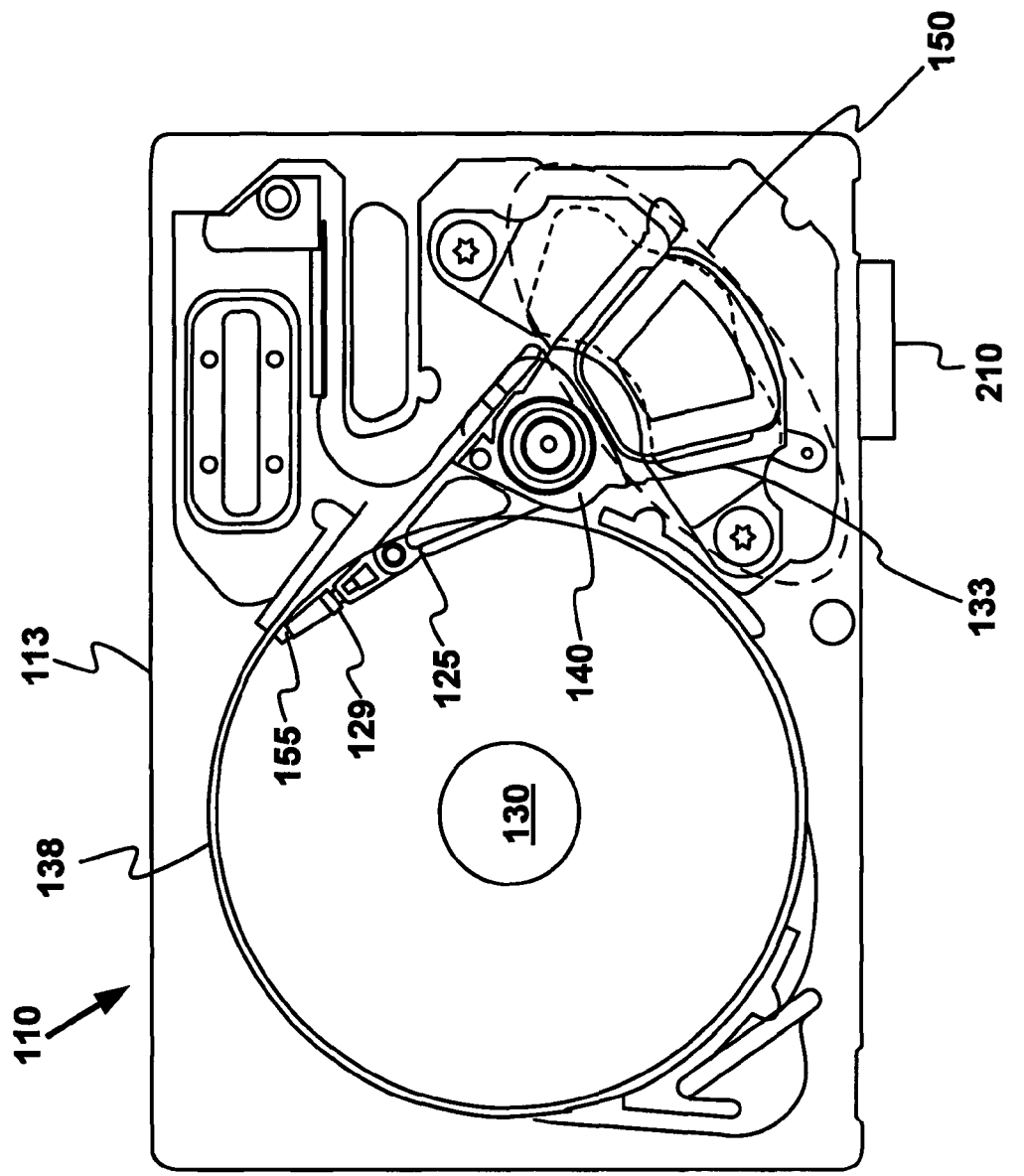
FIG. 1 is a plan view of an HDD with cover and top magnet removed in accordance with one embodiment of the present invention.

With reference now to FIG. 1, a schematic drawing of one embodiment of an information storage system including a magnetic hard disk file or HDD 110 for a computer system is shown. Although, only one head and one disk surface combination are shown. What is described herein for one head-disk combination is also applicable to multiple head-disk combinations. In other words, the present technology is independent of the number of head-disk combinations.

In general, HDD 110 has an outer housing 113 usually including a base portion (shown) and a top or cover (not shown). In one embodiment, housing 113 contains a disk pack having at least one media or magnetic disk 138. The disk pack (as represented by disk 138) defines an axis of rotation and a radial direction relative to the axis in which the disk pack is rotatable.

A spindle motor assembly having a central drive hub 130 operates as the axis and rotates the disk 138 or disks of the disk pack in the radial direction relative to housing 113. An actuator assembly 140 includes one or more actuator arms 125. When a number of actuator arms 125 are present, they are usually represented in the form of a comb that is movably or pivotally mounted to base/housing 113. A controller 150 is also mounted to base 113 for selectively moving the actuator arms 125 relative to the disk 138. Actuator assembly 140 may be coupled with a connector assembly 210, which is utilized to convey data between arm electronics and a host system, such as a computer, wherein HDD 110 resides. In one embodiment of the invention, the exemplary fiber optic device is used to solder a connector or flex cable coupled to controller 150.

In one embodiment, each arm 125 has extending from it at least one cantilevered integrated lead suspension (ILS) 129. The ILS 129 may be any form of lead suspension that can be used in a data access storage device. The slider 155 is usually bonded to the end of ILS 129. The level of integration containing the slider 155, ILS 129, and read/write head is called the Head Gimbal Assembly (HGA). In one embodiment of the invention, the exemplary fiber optic device is used to solder a connector or flex cable coupled to ILS 129 and/or any component of the HGA.

The ILS 129 has a spring-like quality, which biases or presses the air-bearing surface of slider 155 against disk 138 to cause slider 155 to fly at a precise distance from disk 138. ILS 129 has a hinge area that provides for the spring-like quality, and a flexing interconnect that supports read and write traces and electrical connections through the hinge area. A voice coil 133, free to move within a conventional voice coil motor magnet assembly is also mounted to actuator arms 125 opposite the head gimbal assemblies. Movement of the actuator assembly 140 by controller 150 causes the head gimbal assembly to move along radial arcs across tracks on the surface of disk 138.

Many of the electrical connectors associated with a HDD can be quite delicate. For example, flex cables are used in many applications in HDD manufacturing. Flex cables are especially sensitive to damage caused by soldering. Embodiments of the present invention reduce soldering induced damage to flex cables by localizing soldering beams to the location of solder pads without directly heating the flex cable substrate. In one embodiment, an exemplary fiber optic device is used to pattern a soldering beam to match the geometry of a plurality of solder pads such that the solder beam is localized to the area of a solder pad.

Figure 2:
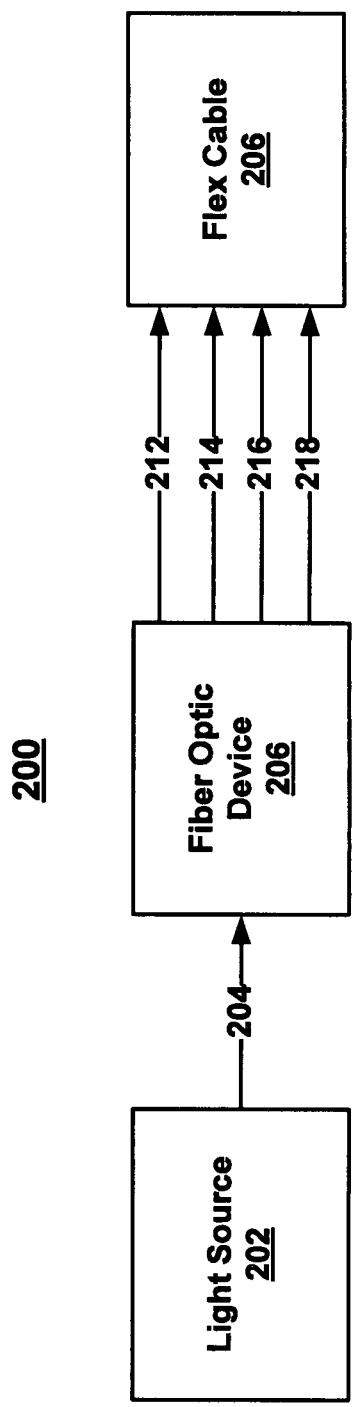
FIG. 2 is a block diagram of an exemplary fiber optic device for enabling localized soldering in accordance with one embodiment of the present invention.

FIG. 2 is a block diagram of an exemplary system 200 for enabling soldering in accordance with an embodiment of the present invention. System 200 includes a light source 202. Light source 202 can be any source capable of performing a soldering operation. In one embodiment, light source 202 is a beam solder source and could be a laser, for example. The light source emits a single beam 204.

The single beam 204 is emitted and received by a fiber optic device 206. In one embodiment, the fiber optic device 206 is used to shape a single beam into a plurality of separate beams with a predetermined output pattern. In general, fiber optic device 206 includes a bundle of separate optical fibers. The number of fibers in fiber optic device 206 can be any number of fibers in accordance with embodiments of the present invention. The optical fibers split the single beam 204 into a plurality of beams 212, 214, 216 and 218. Each of the plurality of beams is emitted to flex cable 206. It is appreciated that the present invention is well suited to be used for enabling soldering of a flex cable substrate and is described in such a manor. However, embodiments of the present invention can be used to solder on any number of substrates where localized soldering is desirable.

Figure 3A:
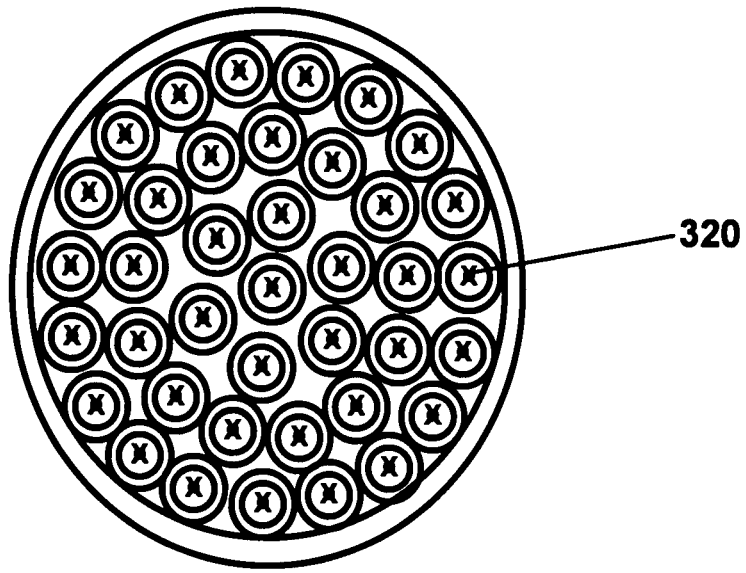
FIG. 3A is an entry portion of an exemplary fiber optic device for enabling localized soldering in accordance with one embodiment of the present invention.

FIG. 3A is an illustration of an entry portion 310 of fiber optic device 206 in accordance with embodiments of the present invention. As stated above, the entry portion 310 of the fiber optic device receives the single beam 204 of FIG. 2. The entry portion 310 includes a plurality of optical fibers 320. In FIG. 3A, the entry portion 310 is shown as round, however, it is appreciated that the entry portion 310 could be any shape or size in accordance with embodiments of the invention.

Figure 3B:
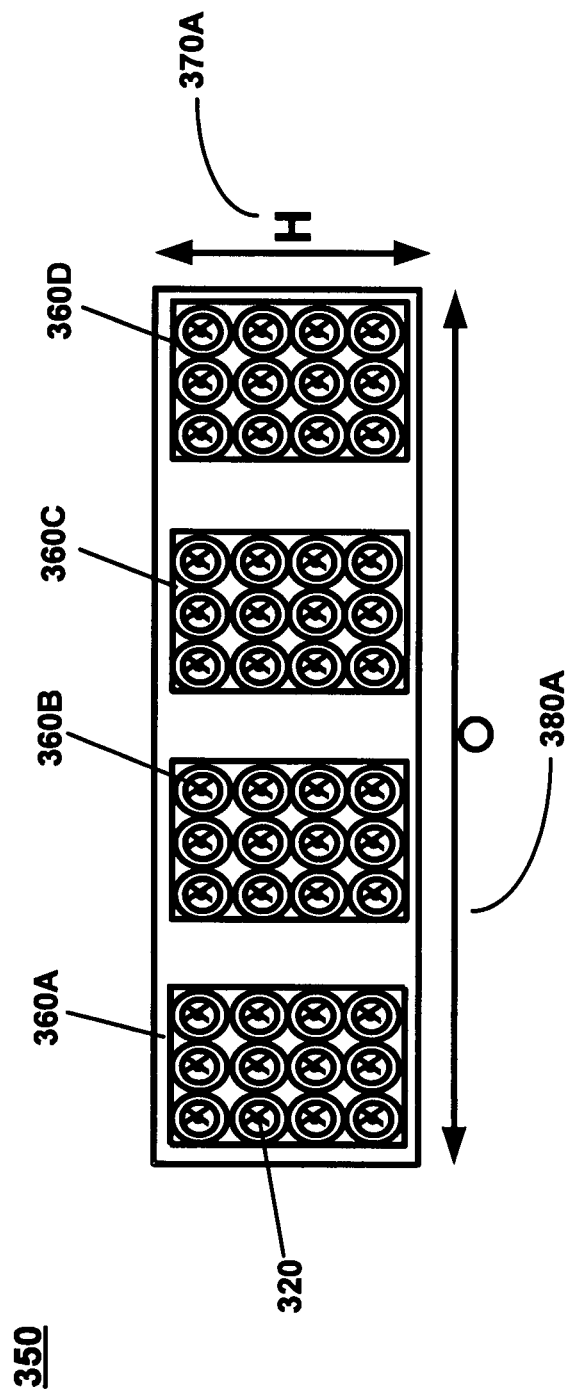
FIG. 3B is an exit portion of an exemplary fiber optic device for enabling localized soldering in accordance with one embodiment of the present invention.

FIG. 3B is an illustration of an exit portion 350 of fiber optic device 206 of FIG. 2. Exit portion 350 includes a plurality of separate apertures 360A, 360B, 360C and 360D. In one embodiment, each of the separate apertures is for emitting one of the plurality of separate beams 212, 214, 216 and 218 of FIG. 2. Each of the separate apertures includes one or more optical fibers 320. In one embodiment, each of the separate apertures includes approximately the same number of optical fibers 320.

In one embodiment of the invention, the plurality of separate apertures is arranged in a specific geometry so that separate beams 212, 214, 216 and 218 can be localized to a particular solder location. In one embodiment, the layout of the separate apertures corresponds to the layout of a plurality of solder locations on a substrate. For example, the exit portion 350 has a width Q 380A and a height H 370A. These measurements can match the geometry of the solder locations or can be a ratio of the geometry of the solder locations.

In FIG. 3B, the shape of the separate apertures is square, however, it is appreciated that the separate apertures can be any shape and can be arranges so that the separate apertures shape closely matches the shape of a solder location (e.g., solder pad).

Figure 4:
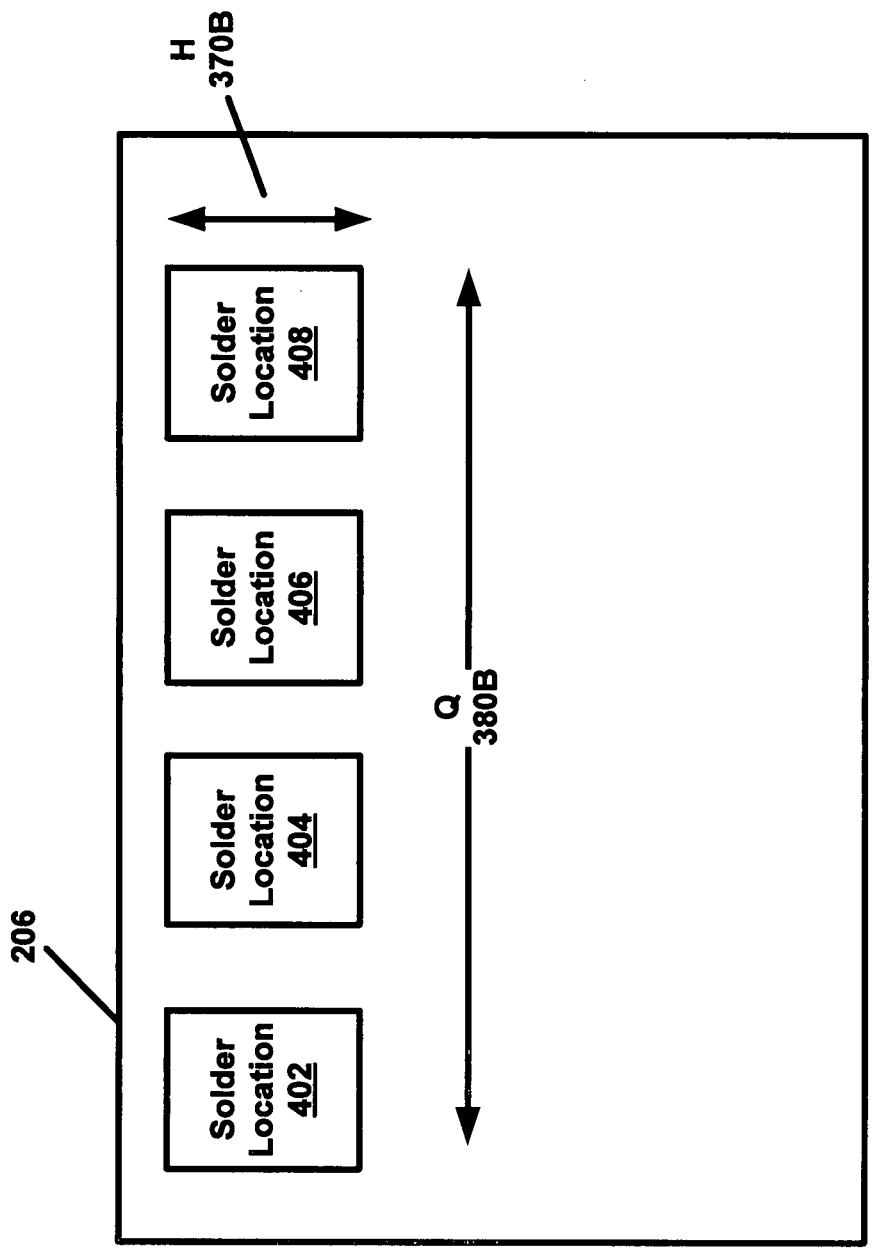
FIG. 4 is an illustration of an exemplary flex cable with a plurality of solder locations in accordance with embodiments of the present invention.

FIG. 4 is an illustration of an exemplary flex cable 206 in accordance with embodiments of the present invention. As stated above, a flex cable is used to describe the present invention, however, it is appreciated that embodiments of the present invention can be used to enable soldering on any number of substrates.

Flex cable 206 includes solder locations 402, 404, 406 and 408. In one embodiment, solder pads 402, 404, 406 and 408 are considered an array of solder locations (e.g., solder pads).

In one embodiment, the geometry of the exit portion 350 of the fiber optic device 200 is arranged such that the beams 212, 214, 216 and 218 are shaped to be localized to the solder locations 402, 404, 406 and 408 of the flex cable 206. In other words, the separate apertures 360A-360D are arranged such that the light they emit is patterned to match a corresponding pattern of solder locations on a substrate.

The dimensions of the exit portion 350 can be an exact match of the dimensions of the solder locations (e.g., 402, 404, 406 and 408) or alternatively, the dimensions can be a ratio of each other. For example, width Q 380A can be equal to Q 380B or can be a multiple of width Q 380B. Correspondingly, height 370A can be equal to height 370B or a multiple of height 370B. In one embodiment, a lens is used to focus the separate light beams on corresponding solder locations.

FIG. 5 is a flow diagram of an exemplary method 500 for soldering in accordance with embodiments of the present invention. At 502, method 500 includes providing en entry portion of a fiber optic bundle for receiving a single light beam for enabling soldering, the fiber optic bundle for splitting the single light beam into a plurality of separate beams, each of which for enabling soldering. In one embodiment, the separate beams are shaped in a pattern that is associated with a pattern of solder locations.

At 504, method 500 includes providing an exit portion of the fiber optic bundle for emitting each of the plurality of beams in a geometric pattern to enable soldering at a plurality of locations simultaneously with the single light beam. In one embodiment, the exit portion geometry enables localized soldering such that the separate light beams are localized to a particular solder location. In one embodiment, localizing the soldering prevents damage to a substrate such as a flex cable.

In one embodiment, the exit portion of the fiber optic device is configured according to a layout of solder locations (e.g., solder pads) on a particular substrate. In other words, the exit portion of the fiber optic device is customized for a particular application such as soldering components onto a flex cable. The geometry of the solder locations is used to configure the layout of the exit portion of the fiber optic device such that soldering beams are localized to predetermined solder locations. The fiber optic device of the present invention enable localized soldering which results in improved solder results, especially on delicate substrates such as a flex cable.

Thus, embodiments of the present invention provide a method and apparatus for localized soldering using a fiber optic device. Furthermore, embodiments described herein provide a fiber optic device with an exit portion that localizes solder beams to pre-determined solder locations. Moreover, the method and apparatus for soldering shape a single solder beam into a pattern of separate beams for soldering a plurality of components simultaneously. In addition, the benefits described herein are realized with minimal modification to the overall HDD manufacturing process in general and to the connector assembly, HDD housing and electrical card in particular.

Example embodiments of the present technology are thus described. Although the subject matter has been described in a language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A fiber optic device for enabling soldering comprising:
    a single entry point for receiving a single optical fiber bundle configured for receiving a single light beam wherein said optical fiber bundle splits said light beam into a plurality of separate portions, each of said separate portions for enabling soldering; and
    an exit portion comprising a plurality of apertures, each for positioning a plurality of fibers of said optical fiber bundle and for emitting more than one of said plurality of separate portions of said light beam in a pattern to enable soldering at a plurality of locations simultaneously utilizing said single light beam, wherein a shape of each aperture of said plurality of apertures, a shape of said pattern of said plurality of fibers of said optical fiber bundle, and a shape of a corresponding solder pad match each other.

2. The fiber optic device of claim 1 wherein said pattern substantially matches an array of solder pads associated with a flex cable.

3. The fiber optic device of claim 1 wherein said plurality of apertures is arranged according to a geometry associated with solder locations on a flex cable.

4. The fiber optic device of claim 1 wherein each of said plurality of apertures comprises an equal number of said fibers of said fiber optic bundle.

5. The fiber optic device of claim 1 wherein said pattern enables localized soldering of a plurality of components such that said plurality of separate portions of said light beam is not applied directly to a substrate proximate to said plurality of components.

6. The fiber optic device of claim 1 wherein said exit portion includes an optical lens for focusing each of said plurality of separate portions of said beams at a plurality of flex cable components.

7. A method for soldering comprising:
    providing a single entry point for receiving a single fiber optic bundle, said fiber optic bundle configured for receiving a single light beam for enabling soldering, said fiber optic bundle for splitting said single light beam into a plurality of separate beams, each of said separate beams for enabling soldering; and
    providing an exit portion comprising a plurality of apertures, each for positioning more than one fiber of said fiber optic bundle, said exit portion for emitting each of said plurality of separate beams in a geometric pattern to enable soldering at a plurality of locations simultaneously with said single light beam, wherein a shape of each aperture of said plurality of apertures, a shape of said pattern of said fibers of said optical fiber bundle, and a shape of a corresponding solder pad match each other.

8. The method of claim 7 further comprising:
    determining a geometric layout associated with a plurality of solder pads; and
    providing said exit portion such that said pattern is associated with said geometric layout.

9. The method of claim 7 further comprising:
    arranging said plurality of apertures according to a geometry associated with solder locations on a flex cable such that said plurality of beams is directed to said solder locations without damaging said flex cable.

10. The method of claim 7 wherein each of said plurality of apertures is associated with an equal portion of said fiber optic bundle.

11. The method of claim 7 further comprising:
    focusing each of said plurality of beams with an optical lens at one of said plurality of apertures.

12. A system for soldering comprising:
    a light source for generating a single light beam, said light beam for enabling soldering; and
    a fiber optic beam shaper for shaping said single beam such that said single beam can be used to enable soldering of a plurality of components simultaneously, said fiber optic beam shaper comprising:
        a single entry point for receiving a single optical fiber bundle configured for receiving said single light beam and for splitting said light beam into a plurality of separate portions, each of said portions for enabling soldering; and
        an exit portion comprising a plurality of apertures, each for positioning a plurality of fibers of said fiber optic bundle and for emitting more than one of said plurality of separate portions of said single light beam in a shaped pattern to enable soldering said plurality of components simultaneously with said single light beam, wherein a shape of each aperture of said plurality of apertures, a shape of said pattern of said plurality of fibers of said optical fiber bundle, and a shape of a corresponding solder pad match each other.

13. The system of claim 12 wherein said shaped pattern substantially corresponds to a geometric layout of an array of solder pads.

14. The system of claim 12 wherein said plurality of apertures is arranged according to a geometric layout of solder locations on a flex cable.

15. The system of claim 12 wherein said shaped pattern enables localized soldering of said components on a flex cable such that said flex cable is not damaged.

16. The system of claim 12 further comprising:
an optical lens at one of said apertures for focusing each of said plurality of separate portions of said light beam at said plurality of components.

* * * * *